United States Patent
Miura et al.

(10) Patent No.: US 7,839,547 B2
(45) Date of Patent: Nov. 23, 2010

(54) OPTICAL FIBER ILLUMINATION DEVICE AND INSPECTION APPARATUS

(75) Inventors: Junji Miura, Naka-gun (JP); Takahisa Nakano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 818 days.

(21) Appl. No.: 11/714,225

(22) Filed: Mar. 6, 2007

(65) Prior Publication Data

US 2007/0211318 A1   Sep. 13, 2007

(30) Foreign Application Priority Data

Mar. 8, 2006 (JP) ............... 2006-062760
Feb. 23, 2007 (JP) ............... 2007-044138

(51) Int. Cl.
*G03H 1/00* (2006.01)
(52) U.S. Cl. ............... 359/2; 250/559.01; 250/559.46; 356/430
(58) Field of Classification Search ............... None
See application file for complete search history.

(56) References Cited

U.S. PATENT DOCUMENTS

| | | | |
|---|---|---|---|
| 6,392,768 B1 * | 5/2002 | Yeh et al. ............... 359/25 |
| 2004/0263850 A1 | 12/2004 | Li et al. | |
| 2005/0139792 A1 | 6/2005 | Rivera et al. | |

FOREIGN PATENT DOCUMENTS

| | | |
|---|---|---|
| CN | 1366649 | 8/2002 |
| CN | 1637622 | 7/2005 |
| EP | 1 195 712 A1 | 4/2002 |
| JP | 04-269612 | 9/1992 |
| JP | 4-269612 | 9/1992 |
| JP | 2002-221494 | 8/2002 |
| JP | 2002-221496 | 8/2002 |
| JP | 2003-149263 | 5/2003 |
| JP | 2003-344299 | 12/2003 |
| JP | 2004-150885 | 5/2004 |
| JP | 2005-164429 | 6/2005 |
| JP | 2005-195583 | 7/2005 |

OTHER PUBLICATIONS

European Search Report dated Jun. 1, 2007 for Appln. No. 07004668.5-2216.
Korean Office Action dated May 30, 2008 for Appln. No. 10-2007-22835.
Chinese Office Action dated Jun. 19, 2009 for Appln No. 200710085873.

* cited by examiner

*Primary Examiner*—Stephone B Allen
*Assistant Examiner*—Derek S Chapel
(74) *Attorney, Agent, or Firm*—Pillsbury Winthrop Shaw Pittman, LLP

(57) ABSTRACT

An inspection apparatus includes a light source unit which irradiates illumination light onto a hologram of a medium from a predetermined direction at which diffraction light from the hologram is obtained, a first light receiving member which receives the diffraction light from the hologram, a second light receiving member which receives transmitted part of illumination light irradiated onto the hologram, having passed through the medium, and an identification processing unit which identifies authenticity of the hologram from the diffraction light received by the first light receiving member and identifies a defect of the hologram from the transmitted light received by the second light receiving member.

6 Claims, 12 Drawing Sheets

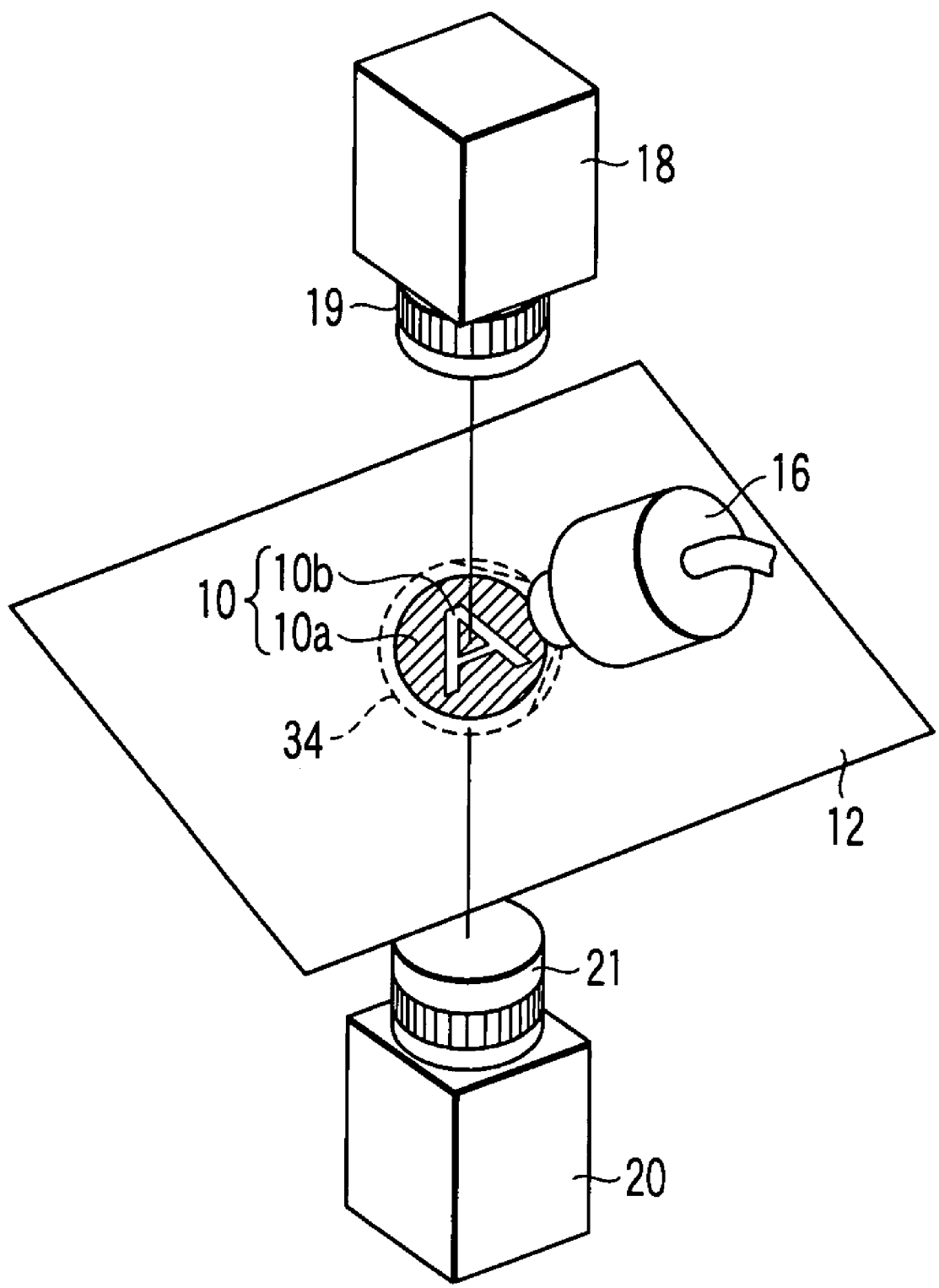
F I G. 1

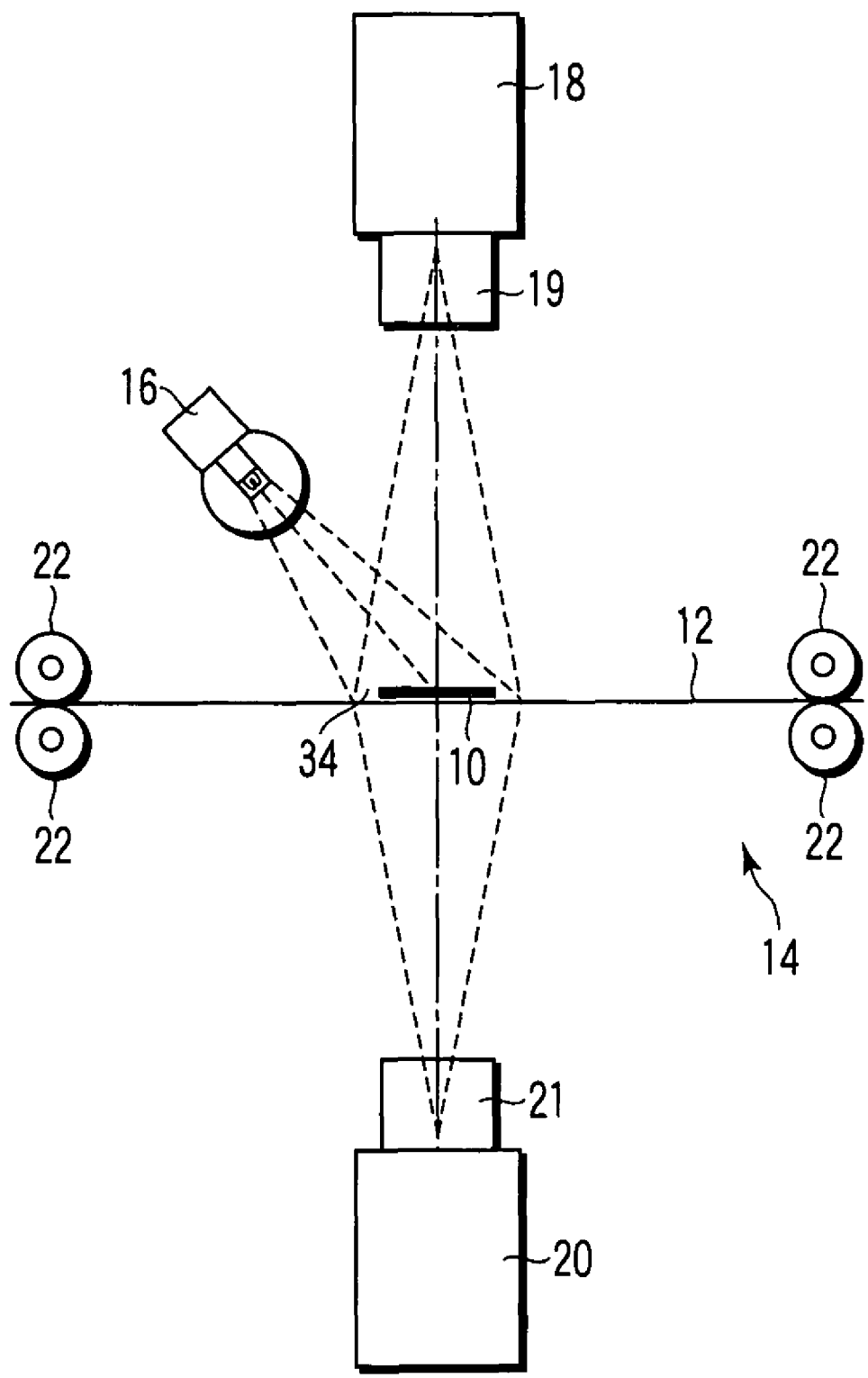
F I G. 2

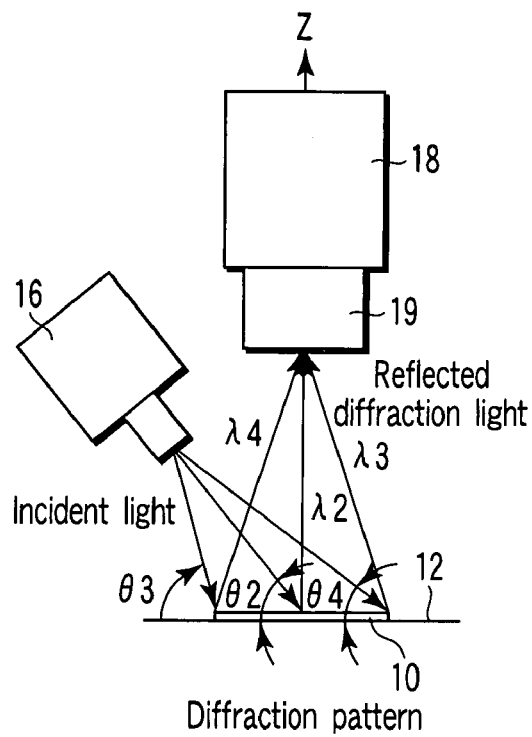
F I G. 5
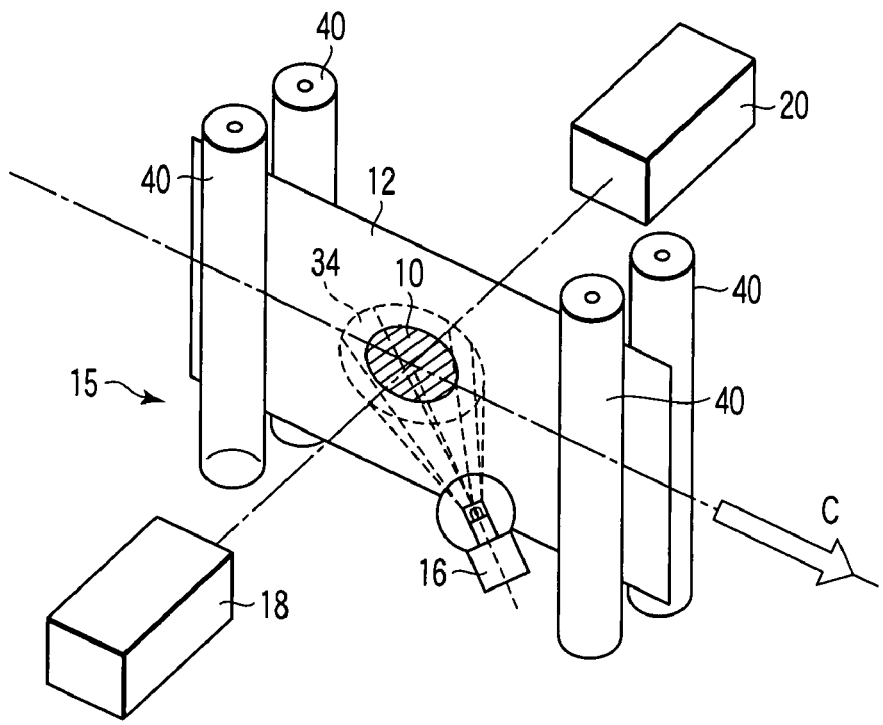
F I G. 6

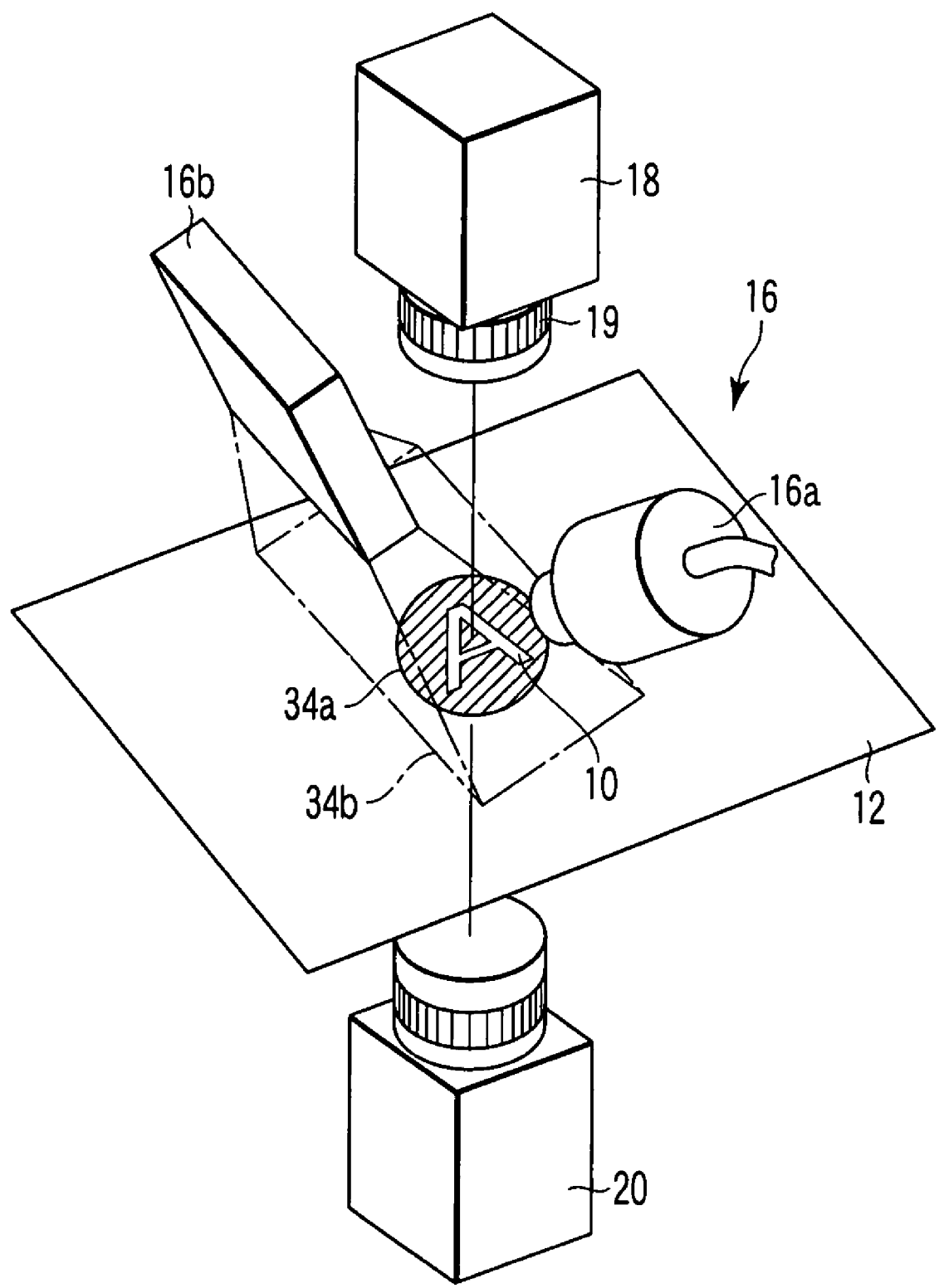
F I G. 7

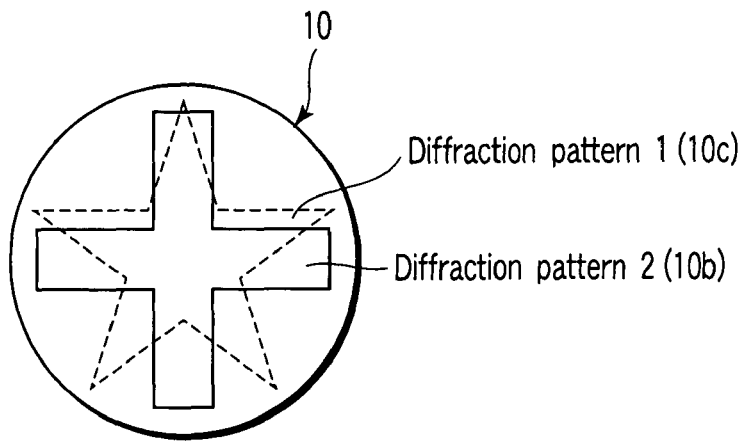
F I G. 16
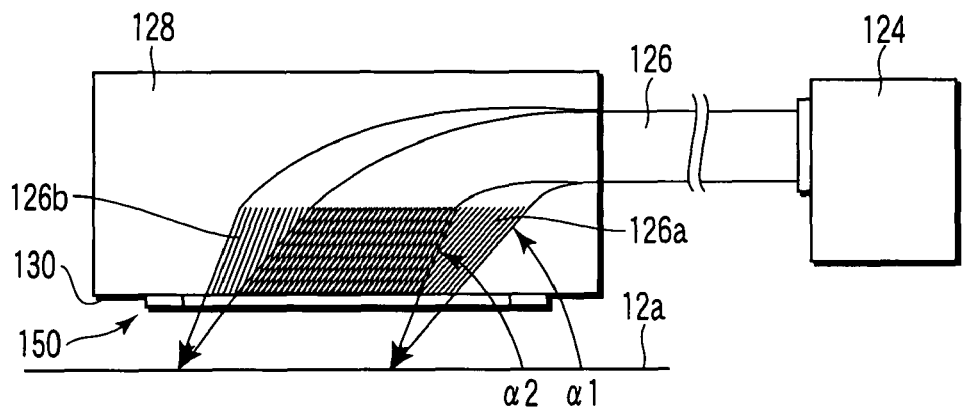
F I G. 17
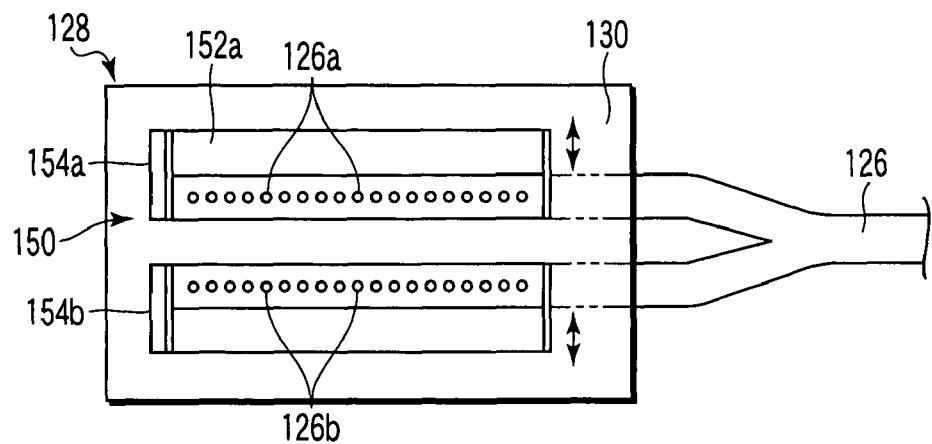
F I G. 18

OPTICAL FIBER ILLUMINATION DEVICE AND INSPECTION APPARATUS

CROSS-REFERENCE TO RELATED APPLICATIONS

This application is based upon and claims the benefit of priority from prior Japanese Patent Applications No. 2006-062760, filed Mar. 8, 2006; and No. 2007-044138, filed Feb. 23, 2007, the entire contents of both of which are incorporated herein by reference.

BACKGROUND OF THE INVENTION

1. Field of the Invention

The present invention relates to an optical fiber illumination device which irradiates illumination light onto a medium to be inspected, such as a card, and an inspection apparatus which inspects a medium to be inspected, such as a hologram-attached paper instrument.

2. Description of the Related Art

A diffraction optical variable device (to be referred to as optical OVD), a typical example of which is a hologram, is a device processed to induce the light diffraction phenomenon on the surface thereof, and it has a pattern which generates vivid colors due to optical diffraction and interference caused by the diffraction pattern. The hologram has optical characteristics different from those of the ordinary printing and therefore it is used as a security thread for paper instruments of, for example, coupons and securities as well as cards such as credit cards. Thus, the hologram is realized as means for determining the authenticity of these media.

On the other hand, for the purpose of quality control of hologram-attached paper instruments and cards, various inspection apparatuses are used to inspect holograms attached to the paper instruments and cards. For example, Jpn. Pat. Appln. KOKAI Publications No. 2004-150885, No. 2002-221494 and No. 2002-221496 disclose an inspection apparatus which irradiates a laser beam on a surface of a medium to be inspected and inspects the reflection diffraction image with a light receiving sensor, an apparatus which inspects a moving medium to be inspected with a line illumination, etc.

As the inspection apparatus, a type which identifies the authenticity of a hologram is conventionally known. In this apparatus, light is applied onto the hologram at a predetermined angle and the light receiving system is placed at a position where the diffraction light is emitted. For example, Jpn. Pat. Appln. KOKAI Publication No. 2001-307173 discloses an inspection apparatus which identifies the authenticity of a hologram, using a spotlight system which projects measurement light, and a plurality of light-receiving systems respectively detecting a plurality of reflection diffraction light components reflection-diffracted by the diffraction pattern of the hologram. Further, Jpn. Pat. Appln. KOKAI Publications No. 2002-221494 discloses an illumination device which illuminates a hologram, in which a plurality of Selfoc (trademark) lenses are arranged at predetermined angles to irradiate light onto the hologram.

In general, an illumination device which uses optical fibers that is less expensive as compared to Selfoc lenses, includes an optical fiber light guide, in which the elemental fibers of the optical fibers are arranged to be vertical to the light-emitting surface of the optical fiber light guide. One end of the optical fiber light guide is located on the light source side, and the light emitted from the light source is transmitted through the optical fiber and emitted from the other end of the optical fiber light guide.

However, the conventional inspection apparatus of the type which utilizes laser light entails such drawbacks as that the conditions for stopping the medium to be inspected for observation are severe, and it requires much time to collect information and for identification process. The conventional inspection apparatus designed to inspect a moving medium entails such a drawback that the rattling of the medium to be inspected causes an adverse effect to the results of the inspection.

Further, paper instruments such as of securities, as they are circulated, will wear down so that the surface condition thereof deteriorates due to chipping, peeling-off, cut, wrinkle, etc., and accordingly there is a possible that the basic optical characteristics of the hologram are lost, which is called "fatigue". For the apparatus which automatically inspects these paper instruments, it is required to inspect the authenticity (genuine or counterfeit) as well as the damaged state. However, there has been no such apparatus provided to inspect such damage, fatigue, etc. of the hologram.

In order to detect reflection diffraction light from a hologram, it is necessary to apply light onto the hologram at a specific angle. In the case where the light is irradiated onto the hologram at a specific angle using a conventional optical fiber light guide, the light-emitting surface of the optical fiber light guide is set to be inclined at a specific angle with respect to the hologram. In the region where the light is applied, the light is strong and concentrated in a section close to the light-emitting surface of the optical fiber light guide, whereas the light is weak and diffused in a section far from the light-emitting surface. As a result, the spreading of the light and the light intensity within the view field to be detected is uneven. A hologram inspection apparatus that uses such an illumination is not able to stably obtain the data within the entire view field to be inspected, which causes an adverse effect on the inspection accuracy.

BRIEF SUMMARY OF THE INVENTION

The present invention has been contrived in consideration of the above-described circumstances, and its object is to provide an optical fiber illumination apparatus which can illuminate a region to be inspected with stably spreading light and at a stable intensity, as well as an inspection apparatus which can stably detect the authenticity and damage of a hologram-attached medium to be inspected.

In order to achieve the above-described object, there is provided, according to an aspect of the present invention, an inspection apparatus which inspects a medium to be inspected on which a hologram is attached, the apparatus comprising: a light source unit which irradiates illumination light onto the hologram of the medium from a predetermined direction at which diffraction light from the hologram is obtained; a first light receiving member which receives the diffraction light from the hologram; a second light receiving member which receives transmitted part of illumination light irradiated onto the hologram, having passed through the medium; and an identification processing unit which identifies authenticity of the hologram from the diffraction light received by the first light receiving member and identifies a defect of the hologram from the transmitted light received by the second light receiving member.

With the above-described structure, it is possible to provide an inspection apparatus which can detect the authenticity and deficiency of a hologram-attached paper instrument in a stable manner.

According to another aspect of the present invention, there is provided an optical fiber illumination apparatus which irradiates a surface to be inspected, comprising: a light source; an optical fiber including a plurality of elemental fibers, which guides light from the light source and emits the light from an emitting end; and a guide member which supports an emitting end portion of the optical fiber and has an emitting surface facing in parallel with the surface to be inspected, the plurality of elemental fibers being arranged side by side and inclined at a predetermined angle excluding 90 degrees with respect to the emitting surface of the guide member in the emitting end portion of the optical fiber, and emitting ends of the plurality of elemental fibers being set to meet the emitting surface of the guide member.

According to still another aspect of the present invention, there is provided an inspection apparatus which inspects a hologram including a diffraction pattern which diffracts reflection light of incident light made at a specific incident angle in a certain direction, the apparatus comprising: a holder mechanism which holds a medium to which the hologram is attached; an optical fiber illumination apparatus which irradiates light on the hologram; an image pickup section which picks up an image of diffraction light from the hologram; an image processing section which processes the image picked up by the image pick up section; and an identification processing section which identifies deficiency, fatigue and authenticity of the hologram from the processed image; the optical fiber illumination apparatus including: a light source; an optical fiber formed of a plurality of elemental fibers, which guide light from the light source and emit the light from emitting ends, and a guide member which holds emitting end portions of the elemental fibers and has an emitting surface facing in parallel with the medium, the plurality of elemental fibers being arranged side by side and inclined at a predetermined angle excluding 90 degrees with respect to the emitting surface of the guide member in the emitting end portion of the optical fiber, and emitting ends of the plurality of elemental fibers being set to meet the emitting surface of the guide member.

Additional objects and advantages of the invention will be set forth in the description which follows, and in part will be obvious from the description, or may be leaned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a perspective view of a paper instrument inspection apparatus according to a first embodiment of the present invention;

FIG. 2 is a side view schematically showing the paper instrument inspection apparatus;

FIG. 5 is a diagram showing diffraction light of the hologram created with illumination of a spotlight;

FIG. 6 is a perspective view of a paper instrument inspection apparatus according to a second embodiment;

FIG. 7 is a perspective view of a paper instrument inspection apparatus according to a third embodiment;

FIG. 16 is a plan view showing the hologram having a plurality of diffraction patterns;

FIG. 17 is a side view of a light guide of a hologram inspection apparatus according to the fifth embodiment;

FIG. 18 is a plan view of a light-emitting surface side of the light guide of the hologram inspection apparatus according to a fifth embodiment;

DETAILED DESCRIPTION OF THE INVENTION

Figure 3:
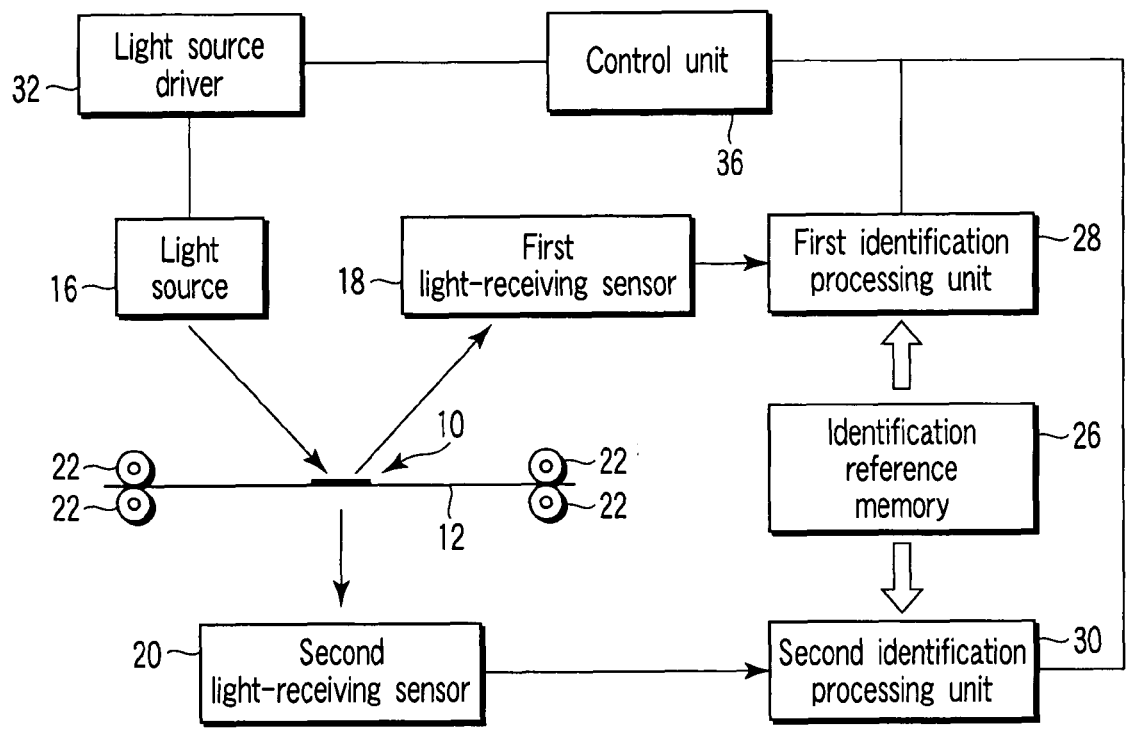
FIG. 3 is a block diagram showing an entire structure of the paper instrument inspection apparatus.

Inspection apparatuses according to embodiments of the present invention will now be described in detail with reference to accompanying drawings.

As shown in FIGS. 1 and 2, a paper instrument inspection apparatus according to a first embodiment includes a holder mechanism 14 which holds a paper instrument 12 such as a valuable paper certificate to which a hologram 10 to be inspected is attached, a light source unit 16 which irradiates illumination light for inspection on the paper instrument, a first light receiving sensor 18 which receives reflection light from the hologram 10 and a second light receiving sensor 20 which receives transmitted light passed through the paper instrument.

The hologram 10 includes, for example, a round-shaped metal foil 10a attached onto the paper instrument 12 and a diffraction pattern (diffraction grating) 10b of a desired shape, for example, in this embodiment a shape of letter "A" formed on the metal foil. The hologram 10, when visible light is irradiated thereon at a predetermined angle, reflects diffraction light corresponding to the diffraction pattern 10b, and shows a rainbow-color characteristic pattern.

The holder mechanism 14 is formed of, for example, a plurality of rollers 22 and belts, which are not shown in the figure, and it holds the paper instrument 12 in a state where a tension is applied thereto, that is, in a tense state without looseness.

The light source unit 16 includes a spotlight unit which irradiate spotlight illumination onto an illumination area 34 that is larger than the area of the hologram 10 to include it within the region. The spotlight unit is, for example, an incandescent light source, and it irradiates illumination light of a wide range of wavelengths including those from the visible light to the near infrared region. The light source unit 16 is set at a predetermined angle with respect to the paper instrument 12 and it irradiates onto the hologram illumination light having an optimized directivity to be able to obtain a diffraction image by the diffraction pattern 10b of the object hologram 10.

The first light receiving sensor 18, which serves as the first light-receiving unit, is provided on the same surface side as the light source unit 16 with respect to the paper instrument 12, at a position to receive the diffraction light from the hologram 10. The first light receiving sensor 18 has an image forming lens 19, and receives the reflection light image formed by the image-forming lens. As the first light receiving sensor 18, a point photosensor, a monochrome CCD sensor, a color CCD sensor, etc., can be employed.

The second light receiving sensor 20, which serves as the second light-receiving unit, is provided on an opposite surface side to the light source unit 16 with respect to the paper instrument 12, at a position to receive the transmitted light passing through the paper instrument 12 around the hologram 10. The second light receiving sensor 20 has an image forming lens 21, and receives the image of the transmitted light formed by the image forming lens. As the second light receiving sensor 20, a point photosensor, a monochrome CCD sensor, a color CCD sensor, etc., can be employed.

As illustrated in FIG. 3, the paper instrument inspection apparatus includes a first identification processing unit 28, a second identification processing unit 30, a light source driver 32 which drives the light source unit 16 and a control unit 36 which controls the operation of the entire device. The first identification processing unit 28 processes data detected by the first light receiving sensor 18 to extract the characteristics and compares the extracted characteristics with reference data stored in an identification reference memory 26, thereby determining the authenticity of the hologram 10. The second identification processing unit 30 processes data detected by the second light receiving sensor 20 to extract the characteristics and compares the extracted characteristics with reference data stored in the identification reference memory 26, thereby identifying the damage or deficiency of the hologram 10 and paper instrument 12. The first and second identification processing units 28 and 30 serve as identification processing units.

Next, the inspection operation of the paper instrument inspection apparatus having the above-described structure will now be described.

Figure 4:
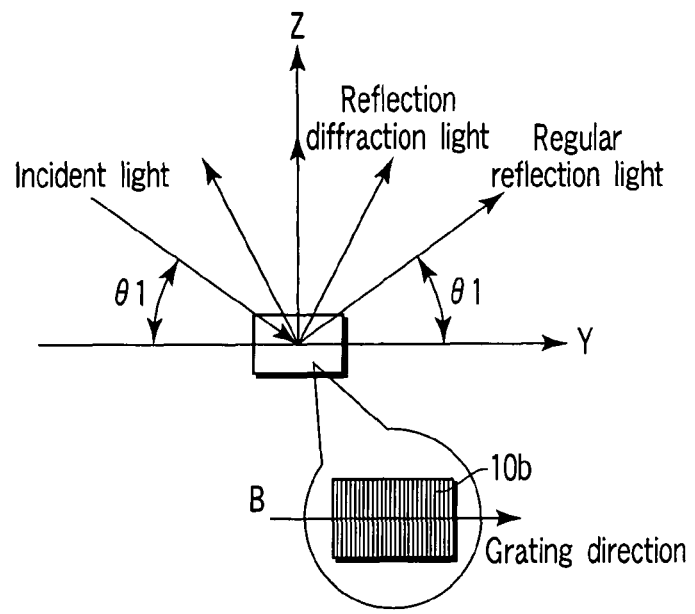
FIG. 4 is a diagram showing diffraction light and reflection light of the hologram.

The conditions for which the diffraction light appears from the hologram 10 to be inspected depend on the orientation and pitch of the diffraction grating of the hologram. As shown in FIG. 4, the light irradiated from the light source unit 16 is applied to the hologram at an incident angle $\theta 1$, which is optimized with a direction B orthogonal to the diffraction grating 10b of the hologram 10. In this case, regular reflection light appears from the diffraction grating 10b at an angle $\theta 1$. Diffraction light is observed in a region between the incident angle and the regular reflection angle.

When the illumination light is the spotlight having an illumination area 34 slightly larger than the size of the hologram to be inspected, that is, in this embodiment, the size of the metal foil 10a, the incident angle of the illumination light to the hologram 10 varies depending on the location on the hologram as shown in FIG. 5; the wavelengths of the diffraction light components $\lambda 2$, $\lambda 3$ and $\lambda 4$ are shifted from each other. As a result, when a color CCD sensor is employed as the first light receiving sensor 18, an image received with the first light-sensitive sensor is obtained as a rainbow-color image in which the wavelength varies depending on the location. The first identification processing unit 28 processes data detected by the first light receiving sensor 18 to extract the characteristics as a two-dimensional image and compares the extracted image with the reference data stored in an identification reference memory 26, thereby determining the authenticity of the hologram 10.

Of the illumination light components irradiated onto the illumination area 34 of the paper instrument 12, those applied onto the hologram 10 are shut off with the metal foil 10a and are not substantially transmitted through the paper instrument. The illumination light components that hit the peripheral area of the hologram 10 are transmitted through the paper instrument 12 and are received with the second light receiving sensor 20. The light shut off by the metal foil 10a serving as a non-light-transmitting region is extremely weak as compared to the light transmitted through the paper instrument 12, and therefore the data on the metal foil can be obtained from the non-transmitting area. The second identification processing unit 30 processes data detected by the second light receiving sensor 20 to extract the characteristics as a one-dimensional or two-dimensional image and compares the extracted image with reference data stored in the identification reference memory 26. In this manner, the second identification processing unit 30 identifies the damage or deficiency of the hologram 10.

As described above, the paper instrument inspection apparatus can inspect the authenticity of the hologram by irradiating illumination spotlight optimized for the hologram 10 attached to a paper instrument 12, and detecting the diffraction light data from the hologram. Thus, those instruments with similar holograms are attached for the purpose of making counterfeits and counterfeit hologram media are not able to reproduce intrinsic characteristics such as diffraction grating patterns or pitches which completely match those of the genuine instruments, and therefore the above-described diffraction light cannot be observed from these counterfeits. Thus, with the hologram, the authenticity of a hologram can be effectively determined. Alternatively, in the case where the same hologram is repeatedly manufactured without intension of making counterfeits, it is possible to inspect whether or not the quality or characteristics of the hologram is stable.

At the same time, the chipping and damaged state of the metal foil used for the hologram can be inspected by detecting the data of the transmitted light having passed through the paper instrument. In the case of the rainbow hologram, a rainbow-color striped pattern can be observed when white light is applied onto the surface thereof. The principle of the mechanism here is that light reflecting on the metal foil reproduces the image, and therefore the hologram in its basic principle has a property in which light is hardly transmitted. Therefore, utilizing the property, the damage or chipping of the metal foil can be inspected with the same inspection apparatus by detecting the data of the transmitted light having passed through the hologram.

In the above-described manner, it is possible to provide a paper instrument inspection apparatus which can stably detect the authenticity and damage of a hologram-attached paper instrument.

When the spotlight illumination is used as inspection light to be irradiated from the light source unit, it is possible to realize the illumination optimized for the characteristics of the diffraction grating of the hologram. If diffused illumination or large-area illumination is employed, there are light components having directivities other than that of the optical illumination. This increases the risk in which these light components may match some other diffraction grating and also similar rainbow-color characteristics can be obtained. From this point of view, it is desirable that the illumination light necessary for the specification should be the minimum possible light optimized for the object to be inspected. The spotlight illumination device meets this requirement.

It is also possible to detect the data of the diffraction light of the hologram even when a photodiode or the like is employed as the first light receiving sensor. However, two-dimensional image data will make it possible to achieve an authenticity inspection of a higher performance. As the second light receiving sensor, which detects the transmitting light having passed through the paper instrument, a photodiode or the like, which is a sensor which can detect one-dimensional data, or alternatively an image sensor such as a CCD sensor which can obtain two-dimensional image data can be employed. In terms of performance, the image sensor is preferable. Further, as the first and second light receiving sensors, color image sensors such as color CCD sensors can be used. With use of such color image sensors, the performance of the identification can be further improved.

As the light source unit, a white illumination light or a spotlight having such a wide wavelength range characteristics as those of an incandescent light source should preferably be employed. In such a case, the rainbow color characteristics of the rainbow hologram to be inspected can be exploited to the maximum. At the same time, even if the hologram has an inclined surface or slightly irregular surface with projections and recesses, the rainbow color characteristics can be stably obtained. How the rainbow color characteristics show vary depending on the conditions, and therefore a stable performance can be achieved by identifying the object based on evaluation criteria such as the presence/absence, frequency, etc. of the characteristics.

When a light source unit including a hot wire, such as an incandescent light is employed, the transmitted light should be designated to light of the near-infrared wavelength region. In this case, the influence caused by the pattern of the background printing in the periphery of the hologram can be reduced, and therefore the performance of inspecting the damage and chipping can be enhanced, which makes it even more effective.

Next, a second embodiment of the present invention will now be described.

In the first embodiment described above, the hologram is inspected while the paper instrument 12 is set still. On the other hand, according to the second embodiment, the inspection apparatus includes a conveying mechanism 15 which conveys the paper instrument 12 along a direction C which is in parallel with the paper surface while applying a tension to the paper instrument along the plane direction of the paper instrument. The conveying mechanism 15 includes a plurality of conveying rollers 40 which convey the paper instrument while holding it between the respective rollers and a conveying belt which is not shown in the figure.

According to the inspection apparatus, illumination light is irradiated from the light source unit 16 onto the illumination area 34 including the hologram 10 while conveying the paper instrument 12 by the conveying mechanism 15. The reflection light from the hologram is detected by the first light receiving sensor 18 and the transmitted light having passed the paper instrument is detected by the second light receiving sensor 20.

The rest of the structure of the second embodiment is identical to that of the first embodiment already described. Therefore, the same parts are designated by the same reference numerals and the detailed explanations therefor will be omitted here. With the second embodiment, it is possible to obtain an operational effect similar to that of the first embodiment. Further, the second embodiment is able to inspect the paper instrument while conveying it, and therefore it can be applied to more various usages.

Next, a third embodiment will now be described.

Figure 8:
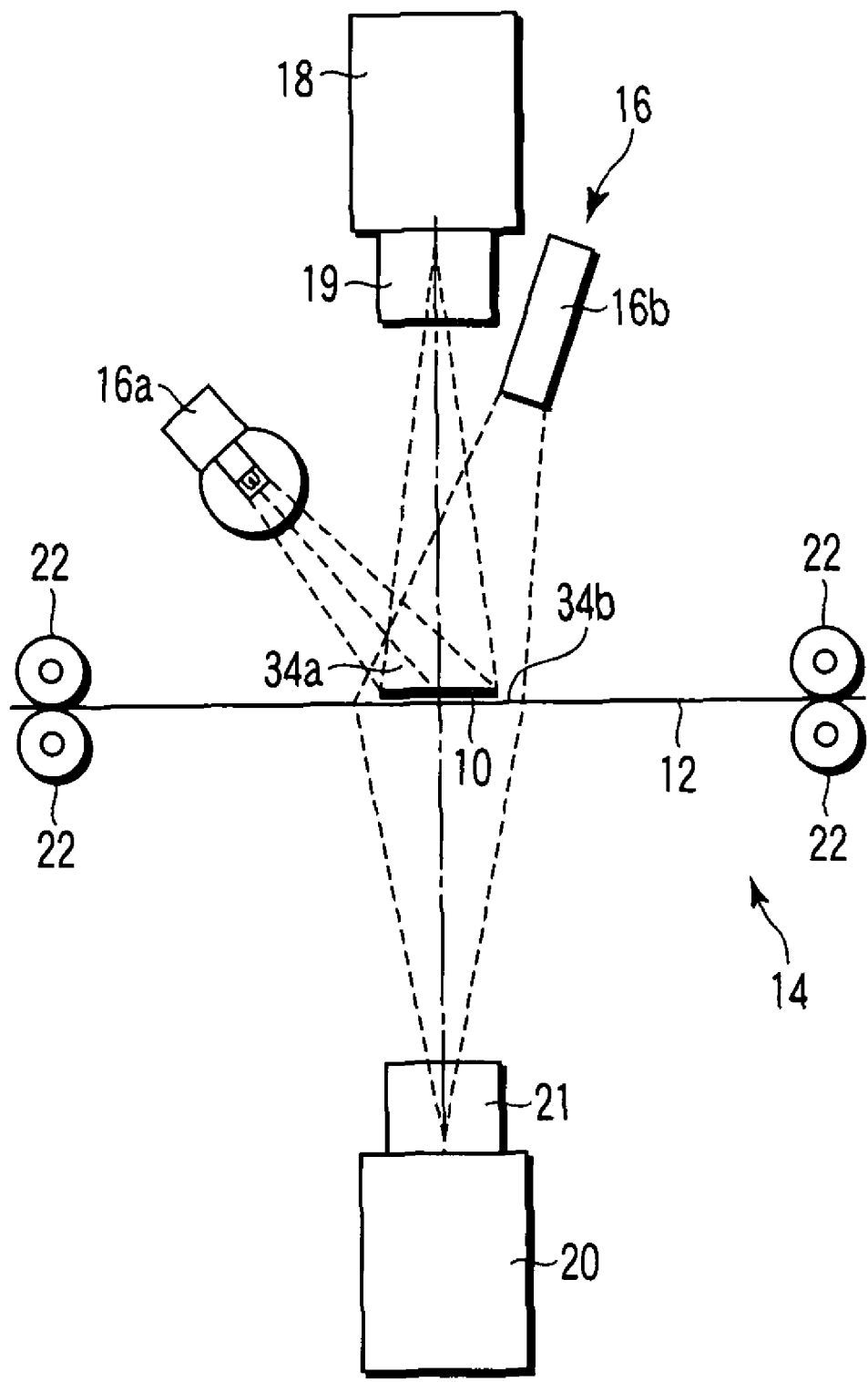
FIG. 8 is a side view schematically showing the paper instrument inspection apparatus according to the third embodiment.

As shown in FIGS. 7 and 8, according to the third embodiment, the paper instrument inspection apparatus includes tow illumination units as the light source unit 16. More specifically, the light source unit 16 includes a spotlight device 16a and a transmitting illumination light device 16b which irradiates illumination light to transmit the paper instrument.

The spotlight device 16a irradiates spotlight illumination onto an illumination area 34a in which a hologram 10 is provided. The spotlight device 16a is formed as a light source which irradiates illumination light of the visible light range. The spotlight device 16a is set at a predetermined angle with respect to the paper instrument 12 and it irradiates onto the hologram illumination light having an optimized directivity to be able to obtain a diffraction image by the diffraction pattern 10b of the object hologram 10.

The transmitting illumination light device 16b irradiates illumination light to transmit the paper instrument, onto the illumination area 34b larger than the area of the hologram 10 to include it therewithin. The transmitting illumination light device 16b is formed as a light source which irradiates illumination light of the near-infrared region. The rest of the structure of the third embodiment is identical to that of the first embodiment already described. Therefore, the same parts are designated by the same reference numerals and the detailed explanations therefor will be omitted here.

With the third embodiment, it is possible to obtain an operational effect similar to that of the first embodiment. Further, since this embodiment has such a light source which includes an illumination light which irradiates illumination light of a wavelength range which reflects on a hologram and another illumination light which irradiates illumination light of a wavelength range which transmits the paper instrument. Each of these illumination light devices can be set to exhibit the optimal performance for each respective detecting operation. More specifically, the spotlight device 16a is formed to have a spot diameter of the same size as that of the hologram 10, and thus the intensity and uniformity of the illumination light can be further enhanced, thereby making it possible to improve the efficiency of the detection. Further, the wavelength range of the illumination light of the transmitting illumination light device 16b is made different from that of the spotlight device 16a, and thus the interference between the wavelength ranges can be prevented. Further, when the wavelength range of the illumination light of the transmitting illumination light device 16b is set to the near-infrared region, the influence by the pattern of the background printing on the paper instrument can be reduced. Thus, the light illumination of the device 16b can be made transmissible through the paper instrument reliably.

In the first to third embodiment described above, as the first and second light receiving sensors, line sensors can be employed. The shape of the spot of the light source device is not limited to circular, but it may be an arbitrary shape.

Next, the hologram inspection apparatus according to a fourth embodiment of the present invention will now be described in details.

Figure 9:
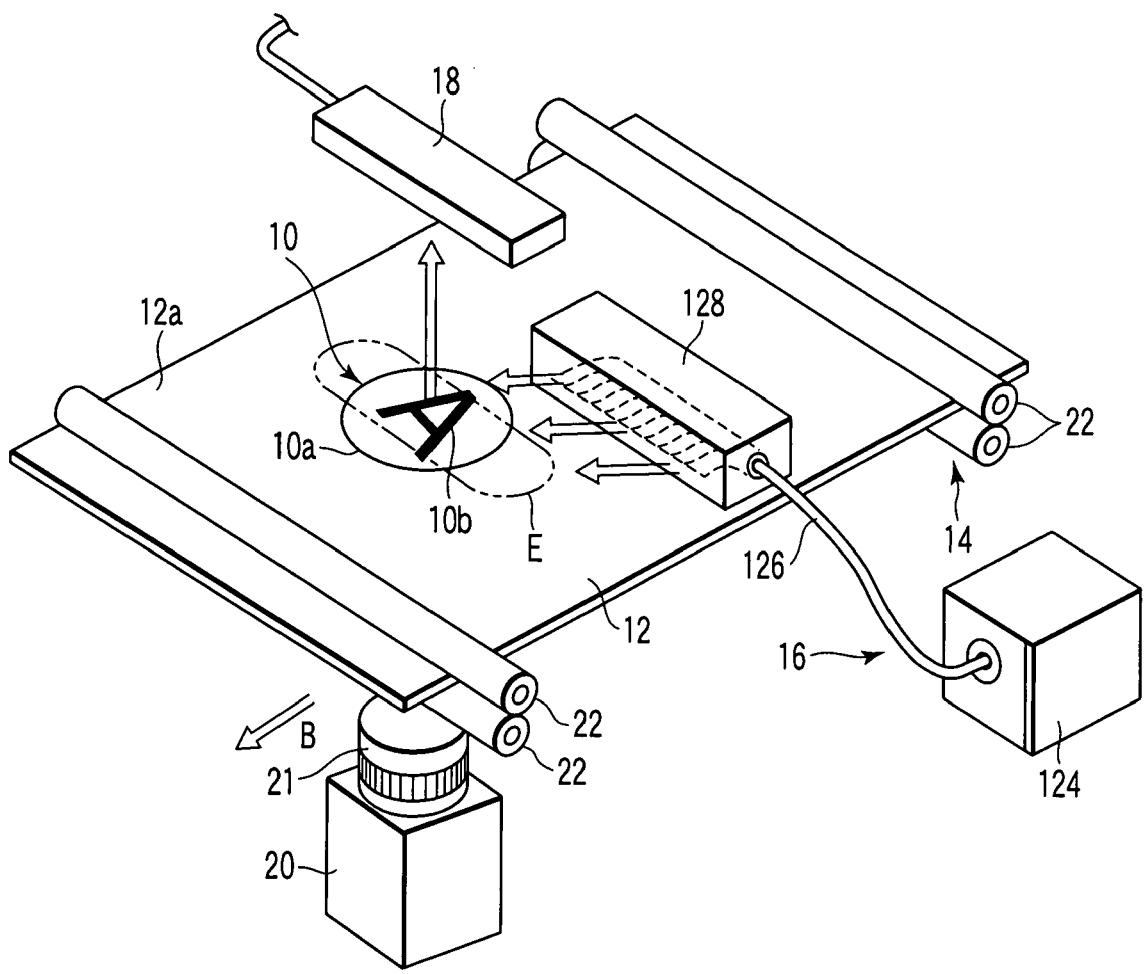
FIG. 9 is a perspective view of a hologram inspection apparatus according to a fourth embodiment.
Figure 10:
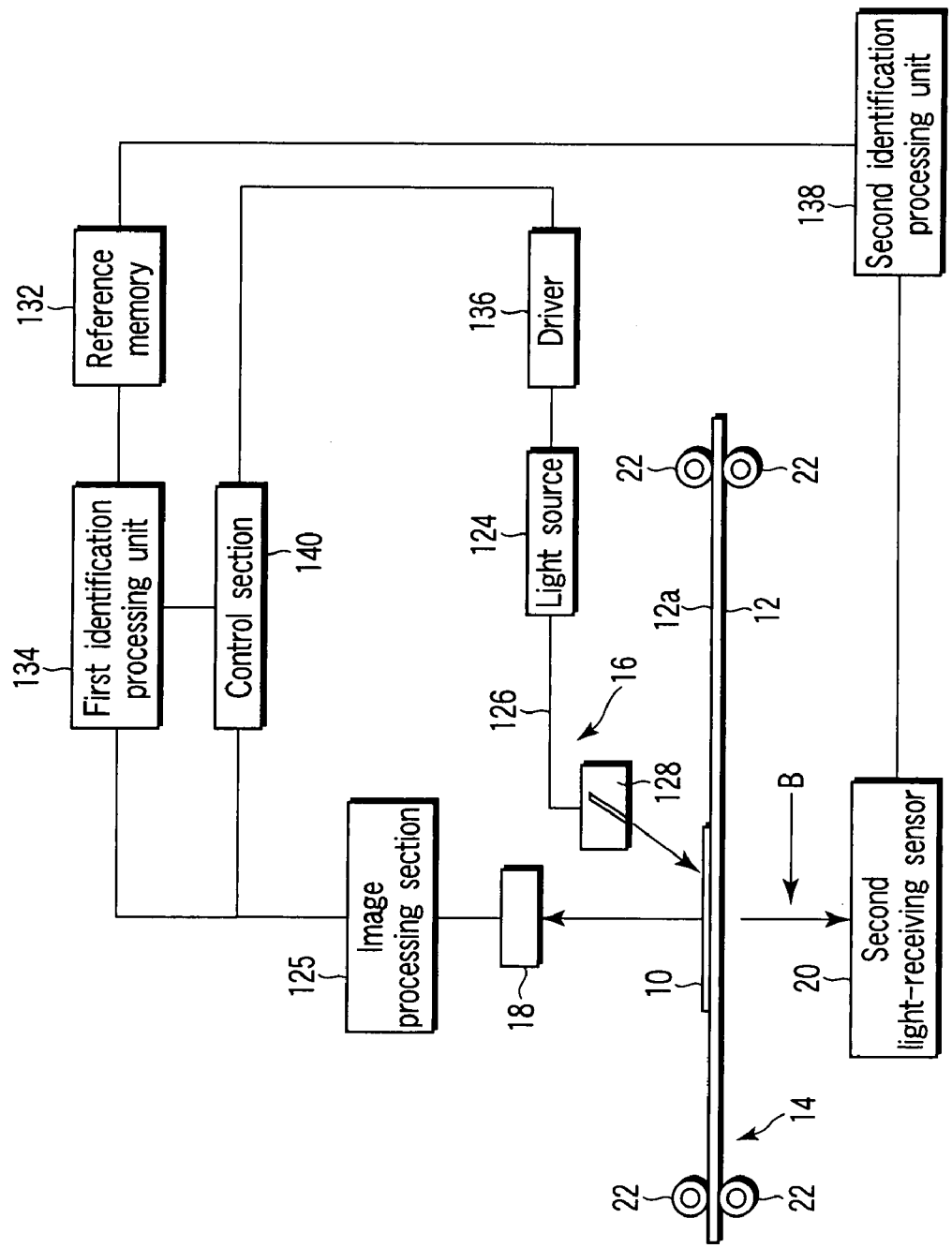
FIG. 10 is a block diagram showing an entire structure of the hologram inspection apparatus.

As shown in FIGS. 9 and 10, this hologram inspecting device includes a holder-conveying mechanism 14 which holds, as a medium to be inspected, a paper instrument 12 to which a hologram 10 is attached, and conveys it in a predetermined direction B, an optical fiber illumination device 16 functioning as a light source unit which irradiates inspection illumination light onto a surface, more specifically, a to-be-inspected surface 12a of a paper instrument 12 containing a hologram 10, an image pickup section 18 serving as a first light-receiving sensor which pick ups an image of diffraction light from the hologram and a second light receiving sensor 20 which receives transmitted light having passed the paper instrument.

The hologram 10 includes, for example, a round-shaped metal foil 10a attached onto the paper instrument 12 and a diffraction pattern (diffraction grating) 10b of a desired shape on the metal foil. The hologram 10, when visible light is irradiated thereon at a predetermined angle, reflects diffraction light corresponding to the diffraction pattern 10b, and shows a rainbow-color characteristic pattern.

Figure 11:
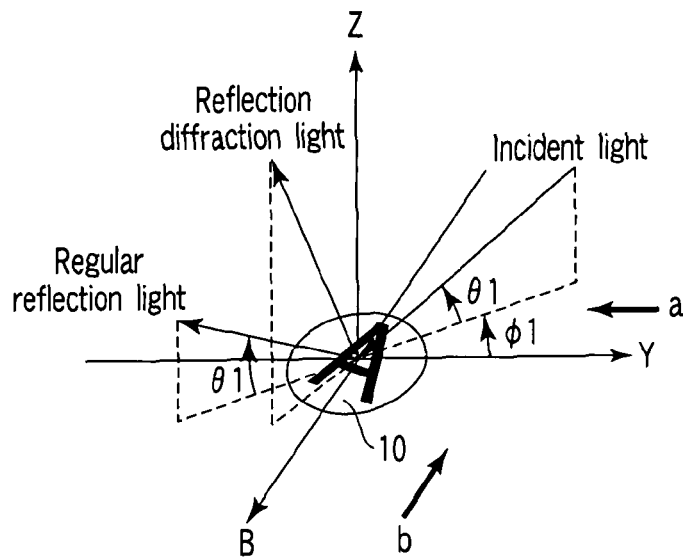
FIG. 11 is a diagram showing incident light on the hologram and reflection diffraction light.

The conditions for which the diffraction light appears from the hologram 10 to be inspected depend on the orientation and pitch of the diffraction grating of the hologram. As shown in FIG. 11, the incident light is applied to the hologram 10 at an incident angle (elevation angle) $\theta 1$, which is optimized with a direction B orthogonal to the diffraction grating 10b of the hologram 10 and a rotation angle $\phi 1$ (an angle of the incident light to a direction Y perpendicular to the conveying direction B or to the transfer direction B). In this case, regular reflection light appears from the diffraction grating 10b at an angle $\theta 1$. Diffraction light is observed in a region between the incident angle and the regular reflection angle.

Figure 12A:
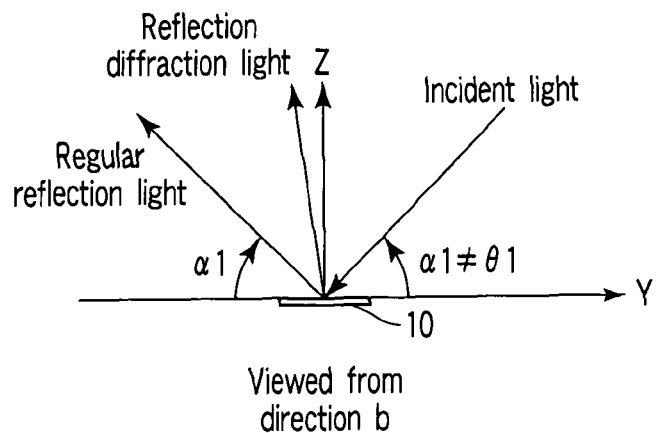
FIG. 12A is a diagram showing incident light on the hologram and reflection diffraction light, viewed from direction a in FIG. 11.
Figure 12B:
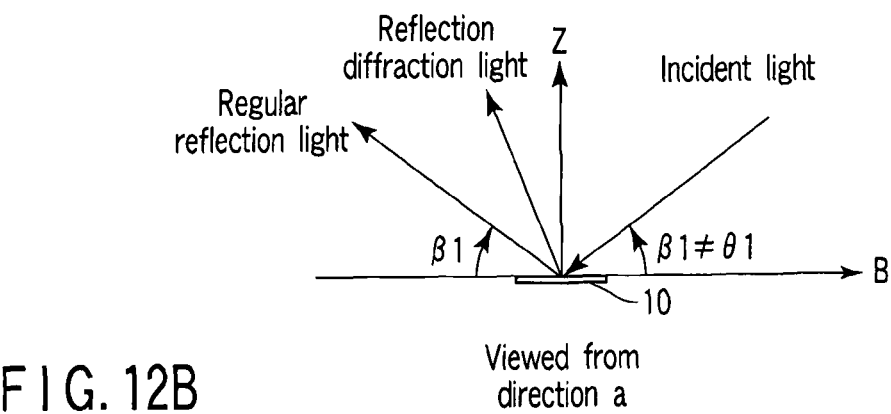
FIG. 12B is a diagram showing incident light on the hologram and reflection diffraction light, viewed from direction b in FIG. 11.

As shown in FIG. 12A which is a diagram viewed from an arrow direction a in FIG. 11, as an incident light is applied to the hologram 10 at an angle $\alpha 1$ which is obtained by synthesizing an elevation angle $\theta 1$ and a rotation angle $\phi 1$, regular reflection light appears from the diffraction grating 10b at an angle $\alpha 1$ and diffraction light is observed in a region between the incident angle and the regular reflection angle. As shown in FIG. 12B which is a diagram viewed from an arrow direction b in FIG. 11, as an incident light is applied to the hologram 10 at an angle $\beta 1$ which is obtained by synthesizing an elevation angle $\theta 1$ and a rotation angle $\phi 1$, regular reflection light appears from the diffraction grating 10b at an angle $\beta 1$ and diffraction light is observed in a region between the incident angle and the regular reflection angle.

The holder-conveying mechanism 14 is formed of, for example, a plurality of rollers 22 and a belt, which is not shown in the figure, and it holds the paper instrument 12 in a state where a tension is applied thereto, that is, in a tense state without looseness, and conveys the instrument in the predetermined direction B relatively with respect to the optical fiber illumination device 16 and the image pickup device 18.

As shown in FIGS. 9 and 10, the optical fiber illumination device 16 includes a light source 124, an optical fiber 126 formed of a bundle of a plurality of elemental fibers 126a, and a light guide 128 serving as a guide member which holds the light emitting end portion of the optical fiber. As the light source 124, for example, a fluorescent lamp or a halogen lamp can be employed.

As shown in FIGS. 9, 10, 13A, 13B and 14, the proximal end of the optical fiber 16 is optically connected to the light source 124, and the light emitting end portion of the optical fiber is held by the light guide 128. The optical fiber 16 guides the light emitted from the light source 124 and emits the light from its emitting end. The light guide 128 is made of, for example, aluminum to have a rectangular parallelepiped shape, and has a flat light emitting surface 130. The light guide 128 is provided above the paper instrument in such a state that the emitting surface 13 faces the to-be-inspected surface 12a of the paper instrument 12 with the emitting surface 13 being in parallel with the surface 12a.

The light guide 128 which holds the light emitting end of the optical fiber 126 is provided at a predetermined angle with respect to the paper instrument 12, and it irradiates onto the hologram illumination light having an optimized directivity to be able to obtain a diffraction image by the diffraction pattern 10b of the object hologram 10. That is, the light guide 128 is arranged at a position of an elevation angle $\alpha 1$ (FIG. 13A) and an elevation angle $\beta 1$ (FIG. 14), where at least one diffraction pattern emits diffraction light to the hologram 10 having the diffraction patterns 10b, attached to the paper instrument 12, and the diffraction light is made incident on the image pickup section 18.

Figure 13A:
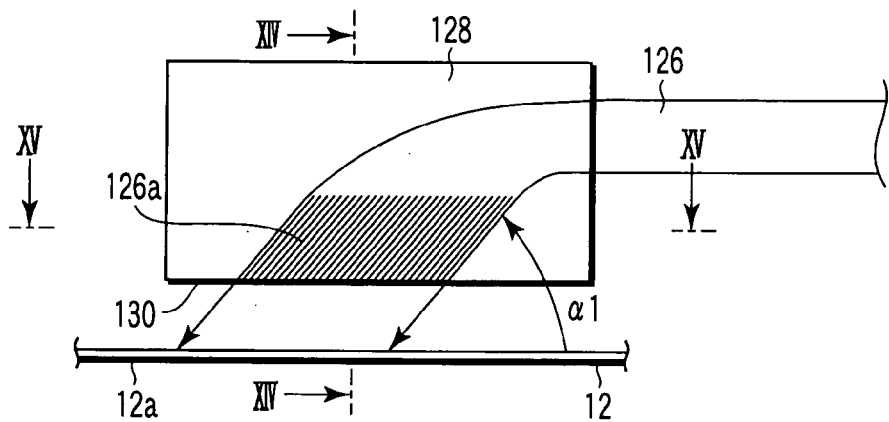
FIG. 13A is a side view of a light guide of the hologram inspection apparatus.
Figure 13B:
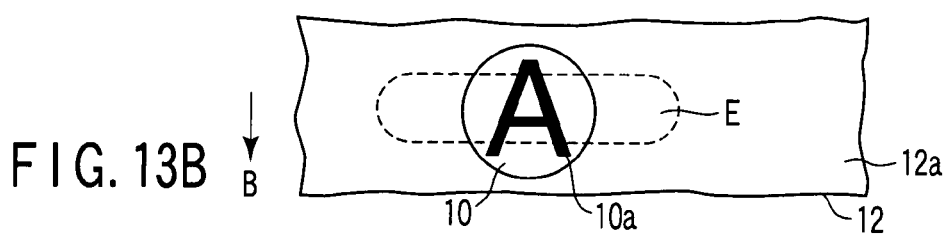
FIG. 13B is a plan view showing a light irradiated region of the light guide of the hologram inspection apparatus.
Figure 14:
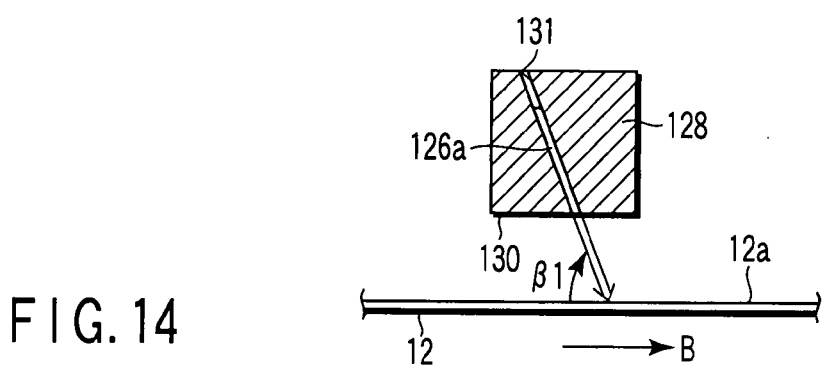
FIG. 14 is a diagram showing a cross section of the light guide taken along the line XIV-XIV of FIG. 13A.

In the light emitting end of the optical fiber 126, the elemental fibers 126a which form the optical fiber is buried in the light guide 128, and the light emitting end is located at the light emitting surface 130 of the light guide. As shown in FIG. 13A which is a diagram viewed from the conveying direction B in FIG. 9, the elemental fibers 126a are each situated to incline by a predetermined angle $\alpha 1$, which is not 90 degrees, with respect to the emitting surface 130. The inclining angle $\alpha 1$ of each of the elemental fibers 126a coincides with an angle which is obtained by synthesizing the elevation angle $\theta 1$ at which the reflection diffraction light is generated from the hologram 10 to be inspected and the rotation angle $\phi 1$. Further, the elemental fibers 126a are arranged in line, for example, in one column in a direction orthogonal to the direction B in which the paper instrument 12 is conveyed. As shown in FIG. 14 which is a diagram viewed from a direction perpendicular to the conveying direction B in FIG. 9, the elemental fibers 126a are each situated to incline by a predetermined angle $\beta 1$, which is not 90 degrees, with respect to the emitting surface 130. The inclining angle $\beta 1$ of each of the elemental fibers 126a coincides with an angle which is obtained by synthesizing the elevation angle $\theta 1$ and the rotation angle $\phi 1$.

Figure 15:
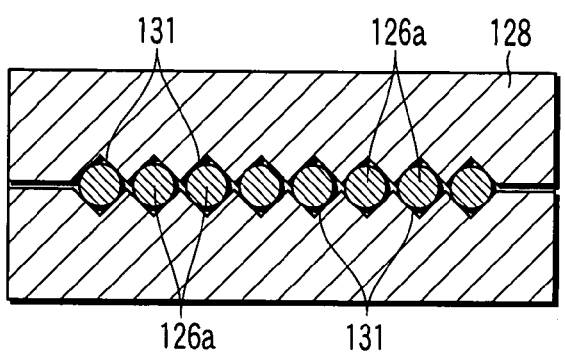
FIG. 15 is a diagram showing a cross section of the light guide taken along the line XV-XV of FIG. 13A.

As shown in FIG. 15, a plurality of V-shaped grooves 131 are formed side by side, and the elemental fibers 126a are respectively engaged in the V-shaped grooves 131 each to be aligned at a position of a predetermined angle.

The illumination light irradiated from the emitting end of the optical fiber 162 onto the paper instrument 12 has a slender irradiation region E extending in a direction orthogonal to the paper instrument conveying direction B. There are sufficient number and sufficient length of elemental fibers 126a provided so as to make the irradiation region E sufficiently wider than the width of the hologram 10. Note that the elemental fibers 126a may be arranged not only in one column, but also two or more lines side by side in the light guide 128.

As shown in FIG. 9, the image pickup section 18 is provided on the same side of the paper instrument 12 as that of the light guide 128, and it is situated at a position where the reflection diffraction light from the hologram 10 is received. As the image pickup section 18, for example, a line sensor is employed. The image pickup section 18 is arranged in a direction orthogonal to the direction B in which the paper instrument 12 is conveyed, and situated to face the irradiation region E of the optical fiber illumination device 16. Besides the line sensor, a monochrome point photosensor, a color point photosensor, a monochrome CCD sensor, a color CCD sensor, etc., can be employed as the image pickup section 18.

The second light-receiving sensor 20 which functions as the second light receiving section is provided on an opposite side to the light guide 128 with regard to the paper instrument 12, and it is situated at a position where the transmitted light having passed through the paper instrument 12 around the hologram 10 is received. The second light-receiving sensor 20 has an image-forming lens 12, and it receives the image of the transmitted light formed with this image-forming lens. As the second image receiving sensor 20, a point photosensor, a monochrome CCD sensor, a color CCD sensor, etc. can be employed.

As shown in FIGS. 9 and 10, the hologram inspection apparatus includes an image processing unit 125, a first identification processing unit 134, a second identification processing unit 138, a light source driver 136 which drives the light source unit 16 and a control unit 140 which controls the operation of the entire device. The image processing unit 28 processes detected data received by the image pickup section 18 to extract the characteristics. The first identification processing unit 134 compares the detected image obtained by the image processing section with reference data stored in an identification reference memory 132, thereby determining the authenticity of the hologram 10 as well as the damage and deficiency of the hologram 10. The second identification processing unit 138 processes data detected by the second light receiving sensor 20 to extract the characteristics and compares the extracted characteristics with reference data stored in the identification reference memory 132, thereby identifying the damage or deficiency of the hologram 10 and paper instrument 12. The first and second identification processing units 134 and 138 serve as identification processing units.

Next, the inspection operation of the paper instrument inspection apparatus having the above-described structure will now be described.

As shown in FIGS. 9 and 10, the paper instrument 12 has the hologram 10 attached thereto and having the diffraction pattern 10b which diffracts and reflects the incident light made at an angle of α1 in the vertical direction. The paper instrument 12 is conveyed in the conveying direction B by the holder-conveying mechanism 14. Then, the light source 124 is turned on so as to apply the illumination light from the emitting end of the optical fiber 126 provided in the light guide 128 towards the hologram 10 on the paper instrument 12. As the hologram 10 on the paper instrument 12 passes through the irradiation region E, the light is constantly applied thereon from the optical fiber inclined at an angle α1 and thus the diffraction reflection light reflects stably from the entire region of the diffraction pattern 10b within the hologram 10 in the vertical direction. When the incident light is radiated on the hologram 10 at an angle of elevation angle of θ1 and a rotation angle φ1, the diffraction light of the diffraction pattern 10b is made incident on the image pickup section 18 at the maximum intensity. The diffraction light from the hologram 10 is received by the image pickup section 18. The image pickup section 18 converts the received diffraction light into an electrical signal, which is input to the image processing unit 125.

The image processing unit 125 processes the detected data input from the image pickup section 18 and extracts the characteristics as a one-dimensional or two-dimensional image. In the case where the diffraction pattern 10b on the hologram 10 contains a damage such as chipping or peeling-off, not reflection diffraction light is detected from the damaged section. In the meantime, in the case where the hologram 10 has such a fatigue by which the surface state is degraded, caused by scratch or wrinkle, the diffraction light may not be obtained or it may be weak in intensity. In the case where the diffraction pattern 10b, which is naturally supposed to exist, is not present, or there is a different diffraction pattern, such a phenomenon that there is no diffraction reflection light occurs. The first identification processing unit 134 compares the image data transferred from the image processing section 125 with the reference data stored in the identification reference memory 132, and thus identifies the damage and deficiency as well as the authenticity of the hologram 10.

Further, of the illumination light irradiated onto the illumination region E of the paper instrument 12, the light component that hits the hologram 10 is shut off by the metal foil 10a and therefore it is not substantially transmitted through the paper instrument. The other light component which hits the area around the hologram 10 transmits the paper instrument 12 and it is received by the second light receiving sensor 20. As compared to the transmitted light having passed the paper instrument 12, the amount of the light component shut off by the metal foil 10a serving as a non-light transmitting region is extremely small, the data of the metal foil can be obtained from the non-light-transmitting region. The second identification processing unit 138 processes data detected by the second light receiving sensor 20 to extract the characteristics as a one-dimensional image or two-dimensional image and compares the extracted characteristics with reference data stored in the identification reference memory 132. In this manner, the second identification processing unit 138 identifies the damage or deficiency of the hologram 10.

In the hologram inspection apparatus having the above-described structure and the optical fiber illumination device, the elemental fibers 126a of the optical fiber 126 are arranged in lines side by side so as to have a predetermined angle θ1 with respect to the light emitting surface of the light guide 128, and the light guide and medium to be inspected are arranged such that the emitting surface of the light guide is in parallel with the to-be-inspected surface of the medium. With this arrangement, the distance taken vertically between the light emitting end each elemental wire 126a and the to-be-inspected surface becomes constant for every elemental fiber. Therefore, within the view field of the inspection, that is, the illumination region E, the spreading and intensity of the light irradiated from the optical fiber 126 can be made uniform. Consequently, the entire hologram 10 can be evenly illuminated with the light emitted from the optical fiber 126 containing the component of a particular illumination angle of θ1. With the fourth embodiment, similar advantageous effects to those of the first embodiment described above can be obtained. Thus, stable reflection diffraction light can be obtained from the entire region of the hologram 10. By utilizing the reflection diffraction light, the deficiency, fatigue and authenticity of the hologram can be detected stably at a high accuracy.

Next, the hologram inspection apparatus according to a fifth embodiment will now be described.

The fourth embodiment described above is described in connection with the device which inspects a hologram having a single type of diffraction pattern, whereas the fifth embodiment is directed to a hologram inspection apparatus having a structure which can inspect a hologram having two or more types of diffraction patterns.

As shown in FIG. 16, in the case where the hologram 10 attached to a medium to be inspected has a diffraction pattern 10b which diffracts the reflection light of the incident light made at an elevation angle of θ1 and a rotation angle φ1 and another diffraction pattern 10c which diffracts the reflection light of the incident light made at an elevation angle of θ2 and a rotation angle φ2, the optical fiber 126 of the optical fiber illumination apparatus 16 includes a plurality of elemental fibers arranged to incline at angles α1 (an angle obtained by synthesizing θ1 and φ1) and α2 (an angle obtained by synthesizing θ2 and φ2) to respectively correspond to the diffraction patterns 10b and 10c.

More specifically, as shown in FIGS. 17 and 18, a plurality of first elemental fibers 126a which form the optical fiber are buried in the light guide 128 in the emitting end of the optical fiber 126, and the light emitting ends thereof are located to meet the emitting surface 130 of the light emitting surface. The first elemental fibers 126a are each placed to incline by a predetermined angle α1 which does not include 90 degrees with respect to the emitting surface 130. The inclining angle α1 of each first elemental fiber coincides with an angle which is obtained by synthesizing the rotation angle φ1 and the particular incident angle (elevation angle) θ1 at which reflection diffraction light is generated from the diffraction pattern 10b of the hologram 10 to be inspected. Further, these elemental fibers 126a are arranged in lines side by side, for example, in one column along a direction orthogonal to the direction B in which the paper instrument 12 is conveyed.

Further, a plurality of second elemental fibers 126b which form the optical fiber are buried in the light guide 128 in the emitting end of the optical fiber 126, and the light emitting ends thereof are located to meet the emitting surface 130 of the light emitting surface. The second elemental fibers 126b are each placed to incline by a predetermined angle α2 which does not include 90 degrees with respect to the emitting surface 130. The inclining angle α2 of each first elemental fiber coincides with an angle which is obtained by synthesizing the rotation angle φ2 and the particular incident angle (elevation angle) θ2 at which reflection diffraction light is generated from the diffraction pattern 10b of the hologram 10 to be inspected. Further, these elemental fibers 126b are arranged in lines side by side, for example, in one column in a direction orthogonal to the direction B in which the paper instrument 12 is conveyed. The second elemental fibers 126b are provided side by side substantially in parallel with the first elemental fibers 126a with an interval therebetween. It should be noted that the proximal end of the optical fiber 126 is connected to the common light source 124.

The light guide 128 is provided at such a position that the emitting surface 130 faces the to-be-inspected surface 12a of the paper instrument 12 as a medium to be inspected, with these surfaces being arranged in parallel with each other. Thus, the first elemental fibers 126a and second elemental fibers 126b of the optical fiber are arranged in lines to have angles of α1 and α2, respectively, with respect to the light emitting surface, and the light guide 128 is placed as described above. With these arrangements, reflection diffraction light stable for both of the diffraction patterns 10b and 10c of the hologram 10 can be obtained.

When the hologram has diffraction patterns n that diffract reflection light beams of a plurality of incident light beams made at angles αn (n=1, 2, 3, . . . ), elemental fibers of the optical fiber are provided at the light emitting portion of the light guide 128 in a plurality of lines at angles αn with respect to the emitting surface 130 in such a manner that the light emitting surface 130 of the light guide faces the to-be-inspected surface to which the hologram is attached, with these surfaces being set in parallel with each other. With these arrangements, the diffraction patterns n of the hologram can general stable diffraction reflection in the entire range.

As shown in FIG. 18, a shutter mechanism 150 is provided for an end of the light guide 128, which is on the side of the light emitting surface 130, to open/close the light emitting ends of the first elemental fibers 126a and those of the second elemental fibers 126b. The shutter mechanism 150 includes a first shutter 152a, a driving section 154a which drives the first shutter, a second shutter 152a and a driving section 154b which drives the second shutter. The first shutter 152a is provided for the light emitting surface to be slidable between a position where the emitting ends of the first elemental fibers 126a are closed and a position where they are opened. The second shutter 152b is provided for the light emitting surface to be slidable between a position where the emitting ends of the second elemental fibers 126b are closed and a position where they are opened. The driving sections 154a and 154b are controlled by the control section 140 described above. The shutter mechanism 150 serves as irradiation control means which allows irradiation of light from only those elemental fibers arranged at desired angles, output the elemental fibers which form the optical fiber.

More specifically, when the hologram has the n-number of diffraction patterns, and reflection diffraction light is to be obtained from all of the n-number of diffraction patterns, the first and second shutter 152a and 152b are switched to the opening position. All of the optical elemental fibers of angles of αn that respectively correspond the n-number of diffraction patterns, in this case, the first elemental fibers 126a and the second elemental fibers 126b that respectively correspond to the two diffraction patterns, should be opened to irradiate light.

In the case where only a predetermined number of diffraction patterns m are to be used to obtain reflection diffraction light out of the n-number of diffraction patters, it suffices if only the optical fibers set at angles of αm, which respectively correspond to the predetermined diffraction patterns, are used to irradiate light. For that operation, in this embodiment, the shutter for the first or second elemental fibers which correspond to the diffraction pattern of the desired reflection diffraction light should be opened, whereas the other shutter is closed to inhibit the emission of light.

In the fifth embodiment, the rest of the structure of the hologram inspection apparatus is identical to that of the fourth embodiment already described. Therefore, the same parts are designated by the same reference numerals and the detailed explanations therefor will be omitted here.

With the hologram inspection apparatus and the optical fiber illumination device, which are formed to have the structures described as above, it is possible to obtain an operational effect similar to that of the fourth embodiment. Further, even in the case where the medium to be inspected has a plurality of diffraction patterns, the deficiency, fatigue and authenticity of the hologram can be detected stably at a high accuracy for all the diffraction patterns by employing the optical fibers respectively corresponding to these diffraction patterns.

Figure 19:
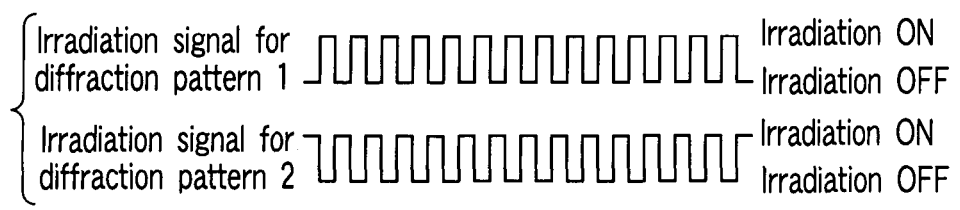
FIG. 19 is a timing chart indicating the control of the irradiation of the emission light.

For example, when there are two diffraction patters 10b and 10c, the irradiation of light from the first elemental fibers and second elemental fibers set at two angles α1 and α2 respectively corresponding to the two diffraction patterns is controlled as shown in FIG. 19. More specifically, while light is irradiated from the first elemental fibers 126a for the diffraction pattern 10b, the first shutter 152a is opened and the second shutter 152b is closed not to irradiate light from the second elemental fibers 126b for the diffraction pattern 10c. On the other hand, while light is irradiated from the second elemental fibers 126b for the diffraction pattern 10c, the second shutter 152*b* is opened and the first shutter 152*a* is closed not to irradiate light from the first elemental fibers 126*a* for the diffraction pattern 10*b*. This cycle is repeated quickly and thus the reflection diffraction light images from the diffraction patterns 10*b* and 10*c* are alternately input to the image pickup section 18. In this manner, the diffraction patterns can be inspected each independently.

Figure 20:
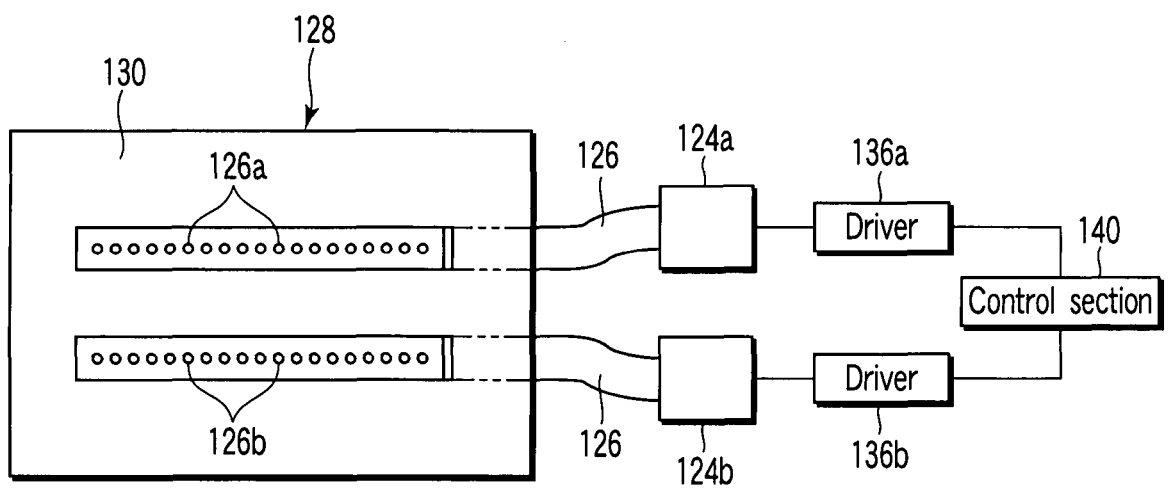
FIG. 20 is a diagram showing an optical fiber illumination device according to another embodiment of the present invention.

The fifth embodiment above is described in connection with such a structure that the optical fiber 126 receives light from the single light source 124. However, it is alternatively possible to have such a structure as shown in FIG. 20 that the optical fiber 126 of the first elemental fibers 126*a* and the optical fiber 126 of the second elemental fibers 126*b* are connected separately and respectively to two independent light sources.

In this case, the following example of the arrangement is considered. That is, an optical source 124*a* is connected to the control section 140 via a driver 136*a*, whereas an optical source 124*b* is connected to the control section 140 via a driver 136*b*. When the light sources 124*a* and 124*b* are switched ON/OFF by the control section 140, the illumination of light is controlled so that the light is irradiated selectively from desired optical fibers. For example, when the light sources 124*a* and 124*b* are alternately turned on and off using the control section 140 and this cycle is repeated quickly as shown in FIG. 19, the reflection diffraction light images from the diffraction patterns 10*b* and 10*c* can be alternately obtained. In this manner, as in the second embodiment described above, a hologram having a plurality of diffraction patterns can be inspected in terms of the deficiency, fatigue and authenticity stably at a high accuracy.

It should be noted that the illumination control method is not limited to the type discussed above, but it may be arbitrary as long as the irradiation of the n-number of optical fibers can be controlled.

The present invention is not limited directly to the embodiments described above, and its components may be embodied in modified forms without departing from the scope or sprit of the invention. Further, various inventions may be made by suitably combining a plurality of components described in connection with the foregoing embodiment. For example, some of the components according to the foregoing embodiment may be omitted. Furthermore, components according to different embodiments may be combined as required.

For example, the hologram-attached media to be inspected are not limited to paper instruments such as coupons and securities, but they may be cards or some other media to which a hologram is attached. In the case where media that do not transmit light such as cards are to be inspected, the second light receiving sensor and the second identification processing unit may be omitted.

The fourth embodiment is described in connection with such a structure that the hologram is inspected while conveying the medium to be inspected. However, the invention is not limited to this structure, but it is alternatively possible that the hologram is inspected while holding the medium to be inspected, at a predetermined position. Further, the fifth embodiment is described in connection with such a structure that a hologram having two types of diffraction patterns is inspected; however it is alternatively possible to inspect a hologram having three or more types of diffraction patterns.

In this case, a plurality of elemental fibers which are set at angles respectively corresponding to the elevation angles each specific to each respective diffraction pattern should be provided.

What is claimed is:

1. An inspection apparatus which inspects a medium to be inspected on which a hologram is attached, the apparatus comprising:

a light source unit comprising a spotlight illuminator which irradiates spotlight illumination light onto the hologram of the medium from a predetermined direction at which diffraction light from the hologram is obtained, and a transmitting light illuminator which irradiates illumination light to transmit through the medium, onto a region larger than the size of the hologram to include the hologram;

a first light receiving member which receives the diffraction light from the hologram;

a second light receiving member which receives the transmitted part of illumination light irradiated onto the hologram, having passed through the medium; and an identification processing unit which identifies authenticity of the hologram from the diffraction light received by the first light receiving member and identifies a defect of the hologram from the transmitted light received by the second light receiving member, wherein the transmitting light illuminator is configured to irradiate illumination light onto the medium in a direction inclined to the medium, and the second light receiving member is arranged to receive the transmitted illumination light in a direction perpendicular to the medium.

2. The inspection apparatus according to claim 1, wherein the spotlight illuminator is configured to irradiate spotlight illumination light having a spot diameter of the same size as that of the hologram.

3. The inspection apparatus according to claim 1, wherein the spotlight illuminator is an illuminator which irradiates illumination light of a visible wavelength range, and the transmitting light illuminator is an illuminator which irradiates illumination light of the near-infrared range.

4. The inspection apparatus according to claim 1, further comprising: a holder mechanism which holds the medium to be inspected while applying a tension to the medium, wherein the light source unit and the first light receiving member are provided on one side of the held medium and the second light receiving member is provided on another side of the medium.

5. The inspection apparatus according to claim 1, further comprising: a conveying mechanism which conveys the medium in a direction parallel to a surface thereof to be inspected while applying a tension on the medium in a plane direction of the medium, wherein the inspection apparatus identifies authenticity and defect of the hologram while conveying the medium by the conveying mechanism.

6. The inspection apparatus according to claim 1, wherein the hologram includes a metal layer attached on the medium and a diffraction pattern on the metal layer, and the identification processing unit is configured to identify a damage of the metal layer of the hologram from the transmitted light received by the second light receiving member.

* * * * *